(12) United States Patent
Ernst et al.

(10) Patent No.: US 7,119,811 B2
(45) Date of Patent: Oct. 10, 2006

(54) IMAGE DISPLAY SYSTEM

(75) Inventors: Rudolf O. Ernst, Union Hall, VA (US); Pun Sing Lui, Hong Kong (CN)

(73) Assignee: Pixia Corp., Sterling, VA (US)

( * ) Notice: Subject to any disclaimer, the term of this patent is extended or adjusted under 35 U.S.C. 154(b) by 261 days.

(21) Appl. No.: 10/243,794

(22) Filed: Sep. 14, 2002

(65) Prior Publication Data

US 2003/0034936 A1    Feb. 20, 2003

(51) Int. Cl.
G09G 5/36  (2006.01)
G09G 5/00  (2006.01)

(52) U.S. Cl. .................... 345/545; 345/629

(58) Field of Classification Search ............ 345/619, 345/629, 630, 634, 27, 548, 684, 686, 687; 382/250; 348/383
See application file for complete search history.

(56) References Cited

U.S. PATENT DOCUMENTS

| | | | |
|---|---|---|---|
| 4,873,513 A * | 10/1989 | Soults et al. .................. 345/27 |
| 4,878,117 A | 10/1989 | Ikehira et al. |
| 5,263,136 A | 11/1993 | DeAguiar et al. |
| 5,513,282 A | 4/1996 | Williams |
| 5,706,451 A | 1/1998 | Lightbody et al. |
| 5,710,835 A | 1/1998 | Bradley |
| RE36,145 E | 3/1999 | DeAguiar et al. |
| 5,905,506 A | 5/1999 | Hamburg |
| 5,933,537 A * | 8/1999 | Hajjahmad et al. ......... 382/250 |
| 6,012,109 A | 1/2000 | Schultz |
| 6,075,905 A | 6/2000 | Herman |
| 6,091,430 A | 7/2000 | Bodin et al. |
| 6,192,393 B1 | 2/2001 | Tarantino et al. |
| 6,222,562 B1 | 4/2001 | Leidich |
| 6,278,432 B1 | 8/2001 | Ratnakar |
| 6,323,854 B1 | 11/2001 | Knox et al. |
| 6,377,306 B1 * | 4/2002 | Johnson et al. ............. 348/383 |
| 6,493,858 B1 | 12/2002 | Solomon |
| 6,674,881 B1 | 1/2004 | Bacus et al. |
| 6,721,952 B1 | 4/2004 | Guedalia et al. |
| 2002/0004860 A1 | 1/2002 | Roman |
| 2002/0093516 A1 | 7/2002 | Brunner et al. |
| 2002/0159632 A1 | 10/2002 | Chui et al. |
| 2002/0194302 A1 | 12/2002 | Blumberg |
| 2002/0196467 A1 | 12/2002 | Delhoune et al. |
| 2003/0031258 A1 | 2/2003 | Wang et al. |

OTHER PUBLICATIONS

Tom Barclay et al., "Microsoft TerraServer: A Spatial Data Warehouse," Microsoft Research Advanced Technology Division, Jun. 1999.

JieBing Yu and David J. Dewitt, "Processing Satellite Images on Tertiary Storage: A Study of the Impact of Tile Size on Performance," 1996.

* cited by examiner

*Primary Examiner*—Kee M. Tung
*Assistant Examiner*—Aaron M. Richer
(74) *Attorney, Agent, or Firm*—Pillsbury Winthrop Shaw Pittman, LLP

(57) ABSTRACT

An image display system is disclosed that enables users to navigate very large digital images quickly and seamlessly. The system is optimized to transmit image data from a disk drive at high data rates. The image data is stored on the disk drive in a file format optimized for high speed retrieval, display, and seamless navigation. The image display system can be cascaded for showing two or more contiguous images.

6 Claims, 18 Drawing Sheets

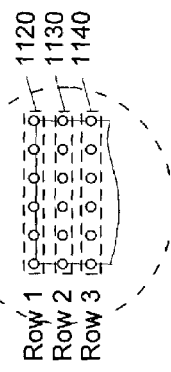
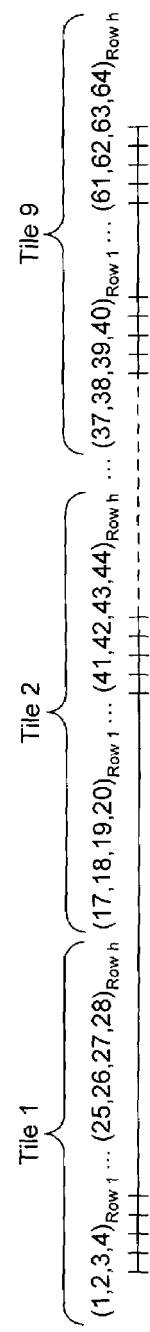
FIG. 11
FIG. 12

IMAGE DISPLAY SYSTEM

RELATED APPLICATIONS

This application claims the benefit of US. Provisional Patent Application No. 60/322,011, filed on Sep. 13, 2001, the contents of which are incorporated by reference herein.

BACKGROUND OF THE INVENTION

The present invention relates to the viewing of images on various devices including, but not limited to, CRT, LCD, TFT, electro-luminescent, plasma, and DLP displays. More particularly, the present invention relates to navigating displayed images by zooming in and out (zooming, panning) and multi-dimensional roaming such displayed images at various levels of zoomed sizing. The images can be geographic (terrestrial and astronomy), chemical and biological compound and organism structures, anatomical structures of plants and animals, graphical representations of complex data and combinations (e.g., data on demographic and resource distribution over a geographical area). Such images tend to be massive in size, but require fast navigation and a high degree of resolution to be useful.

There is a focus for purposes of this invention on images larger than two gigabytes in uncompressed twenty-four bit RGB color space, but other images can be handled beneficially through the present invention. High-resolution digital imagery has only been available to the general public for about the last two years, but much longer in military and industrial settings. Presently, systems that are available for general usage to view very large images in real time are very expensive and contain unnecessary technology for the task at hand. Examples of such a systems are Silicone Graphics, Inc.'s Onyx® family of computing systems (Mountain View, Calif.). Current systems capable of loading/reading an image over two gigabytes in size will pass the image contained on the disk drive through a 3D graphics engine before displaying it. Due to the current speed limitations of these 3D graphics engines, the quality of the image displayed on the screen ultimately suffers. Current systems read the image from the hard drive as a bmp, rgb, or tif file.

Other systems and methods that attempt to improve imagery navigation are described herein below. The contents of each of these references are incorporated by reference.

A System for Managing Tiled Images Using Multiple Resolutions is disclosed in U.S. Pat. No. Re. 36,145, filed Apr. 30, 1991. The system defines an address space for virtual memory that includes an image data cache and a disk. An image stack for each source image is stored as a full resolution image and a set of lower-resolution subimages. Each tile of an image may exist in one or more of five different states as follows: uncompressed and resident in the image data cache, compressed and resident in the image data cache, uncompressed and resident on disk, compressed and resident on disk, and not loaded but re-creatable using data from higher-resolution image tiles.

A Method for Storage and Retrieval of Large Digital Images is disclosed in U.S. Pat. No. 5,710,835, filed on Nov. 14, 1995. Image compression and viewing are implemented with (1) a method for performing DWT-based compression on a large digital image with a computer system possessing a two-level system of memory and (2) a method for selectively viewing areas of the image from its compressed representation at multiple resolutions and, if desired, in a client-server environment.

A method enabling a Fast Processed Screen Image is disclosed in U.S. Pat. No. 6,222,562, filed Jun. 23, 1998. The method includes a display process for displaying predetermined image data in a computer that includes a processor, a fast memory, and a video system having a video memory, comprising the steps of: during a computer execution period, writing contents from a block of the fast memory to a first memory, the fast memory having an access time which is less than an access time for the video memory; writing predetermined image data into the block of the fast memory; processing the predetermined image data from the fast memory; and writing the processed predetermined image data to the video memory.

SUMMARY OF THE INVENTION

The present invention enables users to quickly and seamlessly navigate large images by providing streaming data and uses on-screen and off-screen VRAMs or the like, outputting video signals to a CRT, or the like, or corresponding signals to other displays. The various storage, control and communication components can be preferably on PMC boards communicating via a PMC or mini-PCI bus for example. Images are stored in 'tiled' format as described below and streamed in video output form, or some digital data stream, to a display device, or some device capable of processing the digital data stream. The images are tiled to deal effectively with large ratio panning and zooming while preserving high resolution.

In a preferred system operating system usage is omitted to maximize bandwidth availability and save boot time. Because image data needs to travel from a SCSI PMC board to a video PMC board via the bus, it is essential that the bandwidth of the bus be maximized at all times. This is enabled if there is no operating system running; an operating system tends to cause an unpredictable amount of traffic on the PCI bus or other bus. Omission of an operating system and its loading can reduce boot time to approximately 3 seconds.

In a preferred system, which is essentially stand-alone and outputs video or still image, can be easy to integrate into most environments. Most VGA monitors accept progressive signals between 604×480 and 1280×1024 at 60 to 85 Hz. The system of the invention can run, e.g., at 640×480 at 75 Hz and can therefore be used in conjunction with a supercomputer or a regular office or home type computer. The system is capable of streaming image data from a disk drive to an off-screen VRAM as a user roams through the onscreen VRAM. When the system issues a read command to the SCSI controller, the command is issued as non-blocking and therefore returns control back to the user while the image is being read from the disk in the background. This requires extensive low-level control of the registers on the SCSI controller.

The performance of the system of the invention does not degrade as image size increases. Prior systems degrade drastically as the image size increases because they need to seek through most of the image to actually read the lines they require. Images are stored on the disk drive in a tiled and overlapping format to overcome this limitation. The image is split into tiles with 50% horizontal and/or vertical overlap. Each given display output is entirely within a single tile. When an image is read from the disk it is therefore only necessary to perform one seek followed by a read command. The amount of overlap of neighboring tiles can be adjusted so huge tiles only have minimal overlap, for example, 640 pixels overlap for a 640×480 display.

Speed is further enhanced through various means as follows. Predictive means are provided to preload tiles into the off screen VRAM buffer. Prediction can be based on simple velocity or more complex criteria. Adequate VRAM size (e.g. 32 megabytes) is provided to allow preloading of multiple predictive zones and then choosing one on the fly. When streaming image data through a 3D graphics engine the bandwidth of the image stream is usually reduced drastically. To bypass this limitation, the present invention essentially takes the pixels from the disk drive and passes them into the VRAM without any manipulations. It is due to the fact that no manipulations are being made to the data that the data can be burst into the VRAM without any bandwidth limitations. Also, the disk drive is low-level formatted to be half of the tile width, e.g., the tile width is set to 1280 and disk block size is set to 640. Whenever a 1280×800 tile is read from disk to VRAM it is then necessary to seek to the correct block and then read 4800 (800 lines×2 blocks/line×3 colors) blocks. Preferably, image tiles are block aligned on the disk to optimize disk access.

The invention utilizes a preferred filing system that does not have a two Gigabyte file size limitation. The file limit may be expanded to $2^{40}$ bytes, or approximately 1 terabyte, or greater, to further ensure high speed/high resolution performance.

The system is synchronized to display interrupts. Its graphics board is preferably set up so that it generates an interrupt at the beginning of every vertical interrupt of the display output. This allows for the accumulation of information and change of the display only during a vertical interval.

The system of the invention is capable of panning and zooming very large images with no image degradation. Several features may be utilized to accomplish this as described below. Images are stored in a tiled file format, or the like, to reduce disk access time. The most significant delay when reading a file in conventional systems occurs whenever the disk drive needs to seek to a new location. The tiled file format of the invention ensures that a single unit (assembly) of image data is all that is ever required at any given point in time. This ensures that the disk drive needs to perform one seek to the beginning of the tile followed by reading the entire tile. If the image were not tiled, the disk drive would have to seek to the beginning of the first horizontal line, read the line, seek to the beginning of the next line, and continue doing this until all required lines are read.

In order to further reduce the disk access time, a storage device such as a disk drive is formatted so that the tile size is an integer multiple of the block size. In a preferred embodiment of the invention described below, the block size on the disk drive is set to 640 (instead of 512) and the tile size is set to a width of 1280. This ensures that the data is perfectly aligned with the block boundaries on the disk drive. In other words, there are no extra bits read from the hard drive at any time. In most systems, the data would be read from the disk drive in block chunks and then the useless or extra data would be discarded.

An additional feature of the invention is the ability to zoom in and out of images very quickly. Instead of calculating the various zoom levels on the fly from the massive original file, the zoom levels are calculated offline and stored on the disk drive. The invention includes means for allowing images to be transformed to their file format relatively easily. This approach ensures that the worst-case scenario at any given point in time is that a single tile needs to be read from the disk drive.

In order to guarantee performance it is important that the system is very deterministic and predictable. The invention omits using an operating system because it introduces an additional layer of complexity, which may have certain undesirable side effects. It is very important, for example, that there is no unnecessary traffic on the PCI bus. It is equally important that the registers of the various system boards could be easily accessed and changed in real time. It is due to the low-level control of the SCSI controller that the system is able to send a tile from the disk drive to the video board, while the video board is still able to roam.

BRIEF DESCRIPTION OF THE DRAWINGS

So that those having ordinary skill in the art to which the disclosed system and method appertains will more readily understand how to make and use the invention, reference may be made to the drawings wherein:

FIG. 11 illustrates tiles having horizontal and vertical overlap generated from the image illustrated in FIG. 10;

FIG. 12 illustrates a method of storing the tiles illustrated in FIG. 11;

DETAILED DESCRIPTION OF PREFERRED EMBODIMENTS

Figure 1:
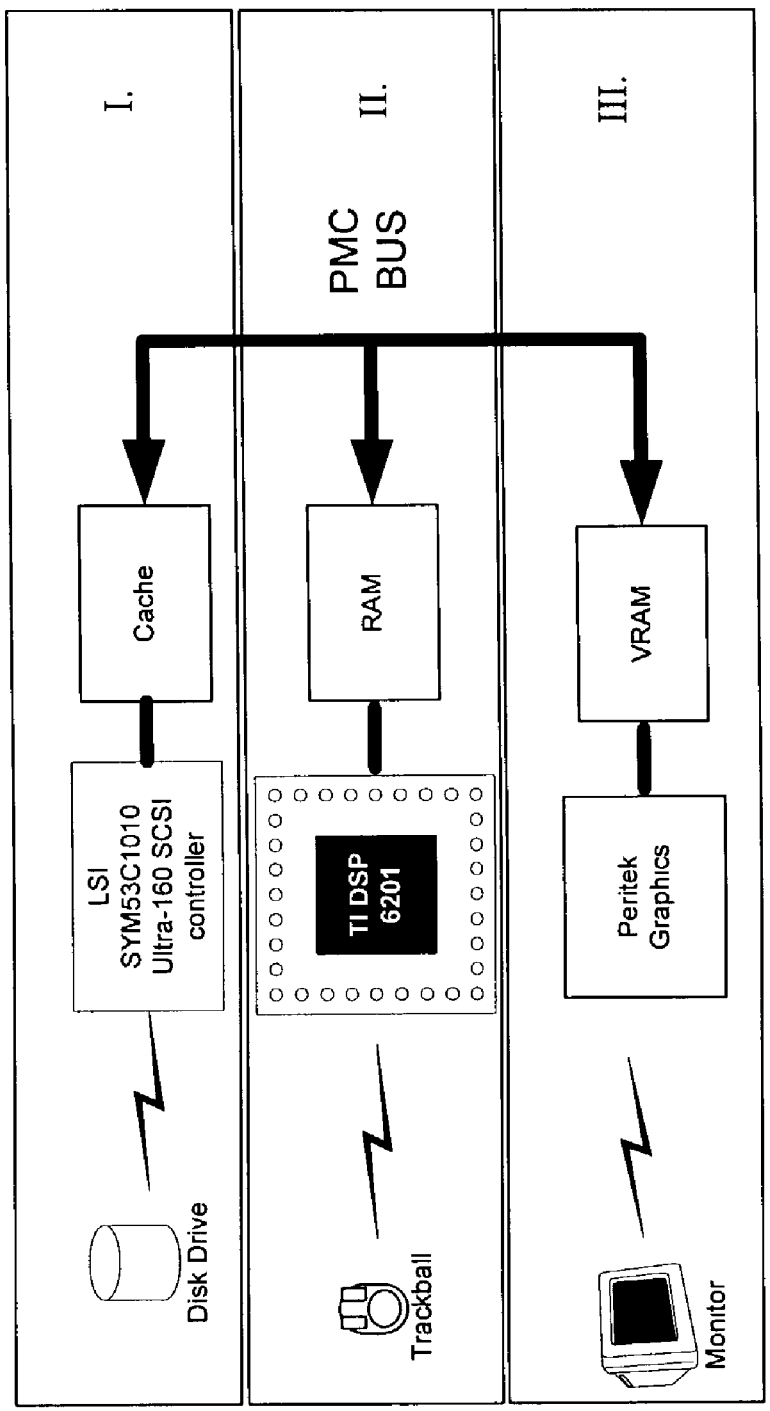
FIG. 1 is a functional hardware diagram of an embodiment of the invention.

An image display system is disclosed that enables users to navigate very large images quickly and seamlessly. The system is optimized to transmit image data from a disk drive to VRAM at high data rates. The image data is stored on the disk drive in a file format optimized for high speed retrieval, display, and seamless navigation. The image display system can be cascaded for showing two or more contiguous images.

The term "display" means a computer output surface and projecting mechanism that shows text and graphic images to a computer user, using a cathode ray tube ("CRT"), liquid crystal display ("LCD"), light-emitting diode, gas plasma, or other image projection technology. It can be appreciated that the entire perimeter of the computer output surface may be the display that shows text and graphic images, and that other smaller viewing boundaries that show text and graphic images to a computer use (i.e., a window or image viewer) may also be considered the display.

The term "pan," "panning," or the like means for a system user to traverse an image on a display in the horizontal and/or vertical direction using an interface device.

The term "pixel" means a physical picture element shown on a display or the image data representing a picture element. Those of ordinary skill in the art will appreciate the various uses of the term. The context in which the term is used should indicate its particular meaning. When the term pixel is used to refer to image data stored on a disk the term is referring to, for example, a single byte of image data for generating a pixel in black-and-white color space on a display, two bytes of image data for generating a pixel in YUV color space on a display, and three bytes of image data for generating a pixel in RGB color space on a display.

The term "block" means a group of bytes handled, stored and accessed as a logical data unit such as an individual file record. Typically, one block of data is stored as one physical sector of data on a disc drive.

The system is implemented in preferred embodiments in hardware and software specific solutions or combinations. It is possible to execute the algorithms of software embodiments on hardware embodiments of the present invention or on other hardware platforms which support, for example, Unix and Windows NT systems. For optimal performance, the software may be run on dedicated hardware of the classes outlined in this description (not limited to particular models of components and sub-assemblies used in examples presented herein).

Due to the lack of control in current operating systems, such as Windows NT or Unix, of the low level hardware registers, it is difficult to communicate with the controller effectively. Additionally, the operating system will tie up the PCI bus unpredictably. The present invention substantially avoids use of an operating system in the pathway of data traffic. The invention can provide one or more choices of dedicated algorithm to be loaded from FLASH to RAM and then executed. There is no traffic on a PCI bus unless initiated per the invention for its specific purposes. The invention also enables communication with the SCSI controller so that the SCSI controller can "push" image pixels from disk to VRAM on a SCSI board or the like, without using the processor. An operating system can be used for peripheral or collateral functions or minimally in the data traffic pathway. However, note FIG. 25 below showing another embodiment with greater operating system involvement in a networked context.

A preferred hardware embodiment utilizes three PMC boards connected together via a PMC (or mini PCI) bus as shown in FIG. 1. The respective boards carry (a) a SCSI Controller and a hard drive; (b) DSP processor and mouse or like interface; and (c) video components including VGA graphics engine and buffer memory, all further detailed below.

Figure 2:
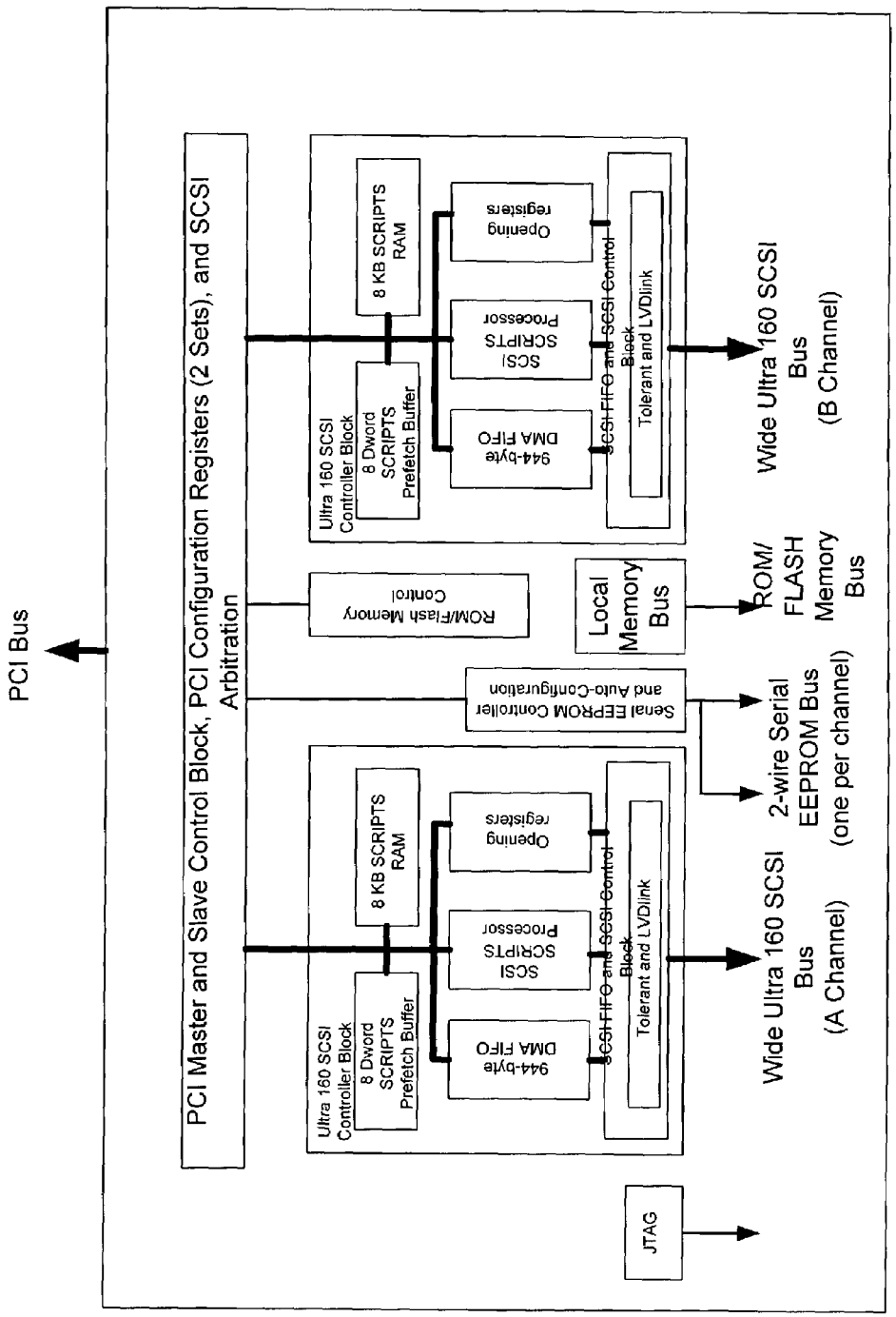
FIG. 2 is a SCSI block diagram per the FIG. 1 embodiment.

Referring to FIG. 2, a block diagram illustrates a preferred form of SCSI controller board that is based on the VMI-PMC-5790 manufactured by VMIC. This controller board utilizes LSI Logic's SYM53C1010 dual-channel ultra 160 SCSI controller. The SYM53C1010 controller has two independent ultra 160 SCSI controllers, support for SCSI, Ultra SCSI, Ultra2 SCSI, and Ultra160SCSI, 8KB of internal RAM per channel for SCRIPTS™, support for Nextreme RAID and for up to 32 disk drives (16 devices per controller). The system has been tested with an 18GB ST318451 LW Seagate drive as well as a 72 GB ST173404LW Seagate drive. The performance numbers are shown in Table 1. These speeds indicate how fast data can move from the disk drive to the VRAM.

TABLE 1

| Direct I/O Performance | | |
| --- | --- | --- |
| | ST318451L W (18 GB) | ST173404L W (72 GB) |
| Read Speed | 40 MB/sec | 34 MB/sec |
| Write Speed | 32 MB/sec | 22 MB/sec |

Figure 3:
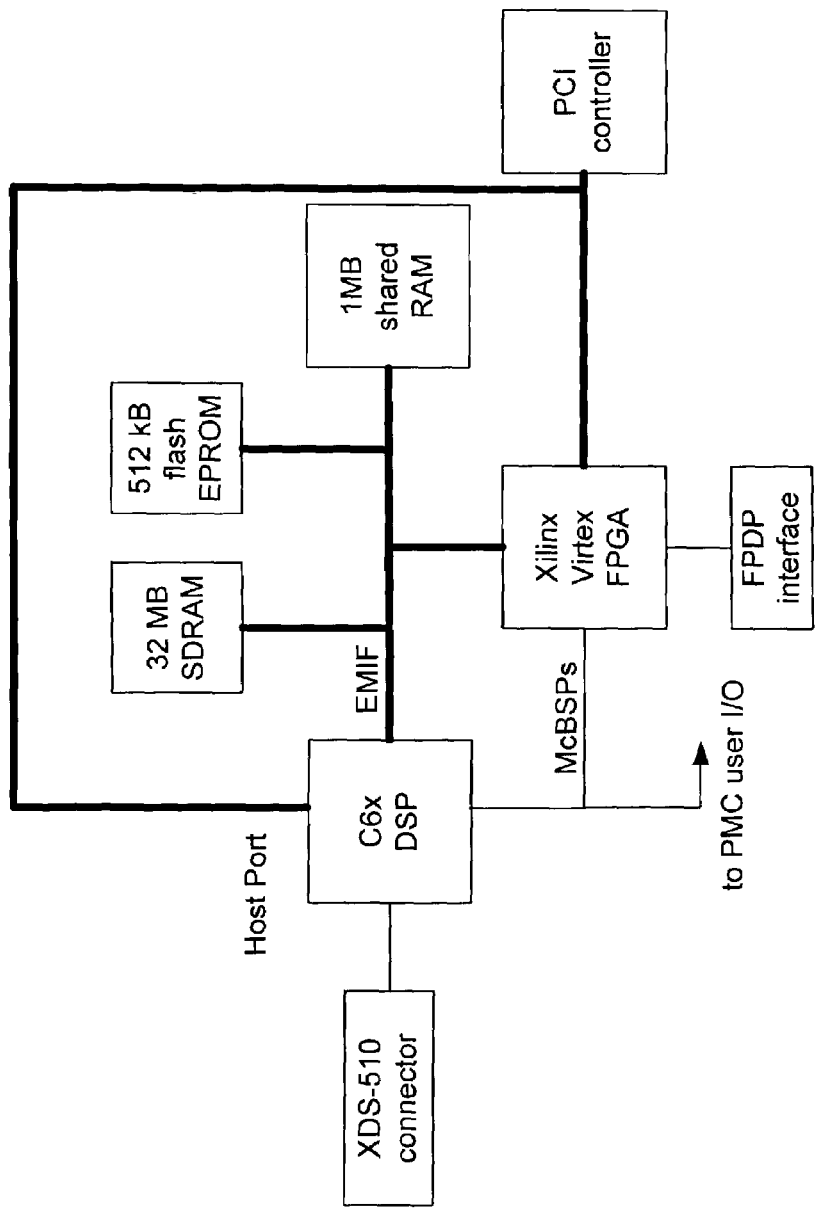
FIG. 3 is a DM11 block diagram per the FIG. 1 embodiment.

A DSP processor that may be used in practice of invention is a Texas Instruments TMS320C6201 digital signal processor chip (6201 DSP), as integrated on a PMC board by Transtech DSP Corp. on its DM11 product. A block diagram of the DSP board is shown in FIG. 3. The board has a 6201 DSP running at 200 megahertz; 32 megabytes SDRAM; Xilinx Virtex FPGA; and FPDP Digital I/O. To make data accessible to the 6201 DSP processor, the data must be read into shared memory. The performance numbers for moving image pixels from disk to shared memory on the DM11 PMC board are shown in Table 2 below. The bandwidth is limited by the bandwidth of the shared memory.

TABLE 2

| I/O via 6201 DSP | | |
| --- | --- | --- |
| | ST318451L W (18 GB) | ST173404L W (72 GB) |
| Read Speed | 15 MB/sec | 15 MB/sec |
| Write Speed | 10 MB/sec | 10 MB/sec |

To increase the performance from shared memory to a video board, the Xilinx FPGA on the DM11 was utilized. Performance values are shown in Table 3 below.

TABLE 3

I/O via FPGA

|  | ST318451L W (18 GB) | ST173404L W (72 GB) |
|---|---|---|
| Read Speed | 25 MB/sec | 24 MB/sec |
| Write Speed | 18 MB/sec | 16 MB/sec |

For user control a trackball, mouse, or joystick may be used via a PS/2 port. To read the PS/2 stream, the McBSP (or Multichannel Buffered Serial Port) is used on the c6201 DSP chip.

Figure 4:
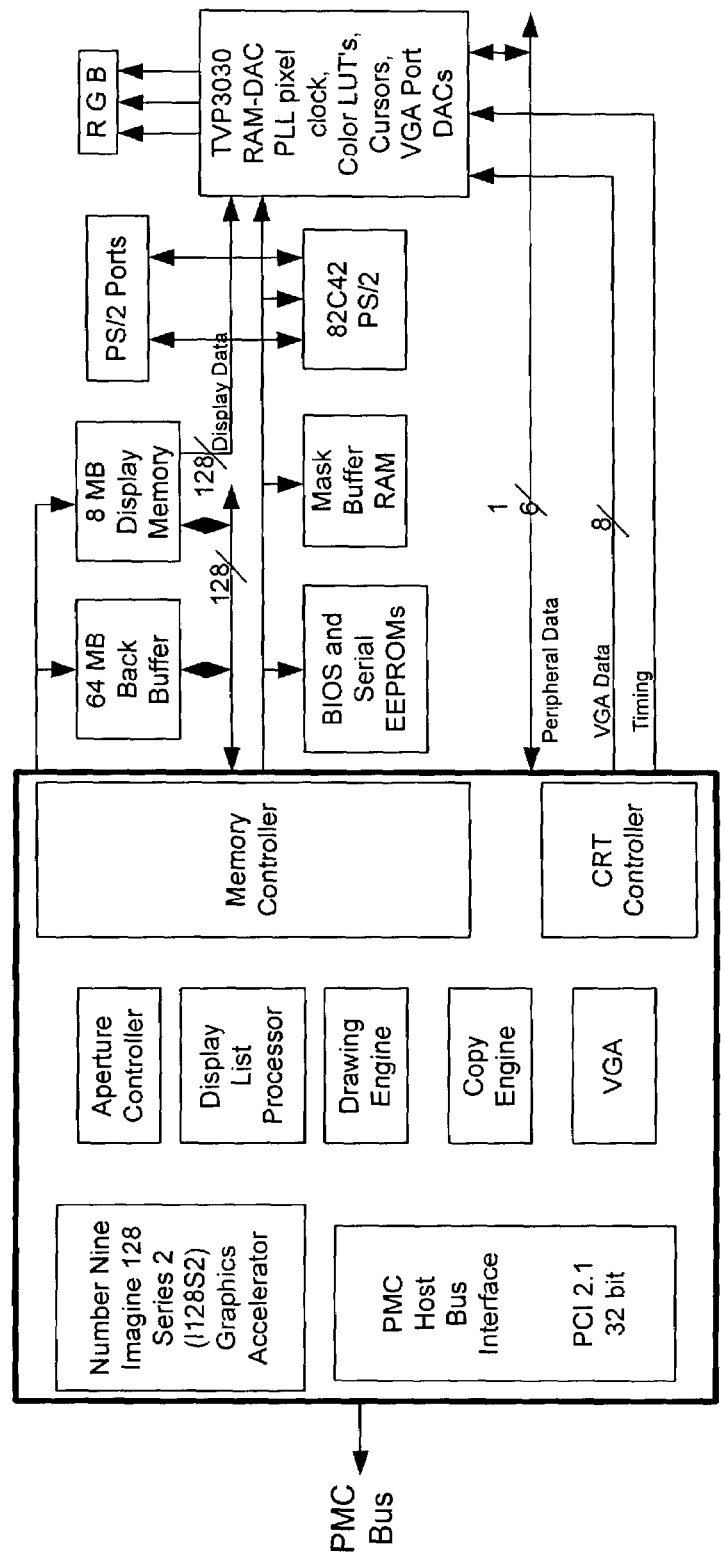
FIG. 4 is a VFX-M block diagram per the FIG. 1 embodiment.

Referring to FIG. 4, a preferred form of the graphics board uses the Peritek VFX-M/L PMC board. The graphics engine on this board is the Number Nine I128 2D/3D graphics engine. The video board contains two 4MB SGRAM memory banks. It affords two independently programmable memory windows; support for 8, 16, and 32 bits per pixel; YUV-RGB color space conversion; and high speed image copy.

YUV color space conversion works in real time on this graphics board. Since YUV 422 pixels only require 16 bits per pixel (instead of 24 bits), users can get a performance improvement of over 30 percent.

The invention also implements a 2-D zooming algorithm on the video board. Essentially, a frame is copied from the off-screen buffer to the on-screen buffer every vertical interval. Instead of just copying the image, the image is scaled as it is copied. This allows the programmer to program a zoom-in or zoom-out of a specific image in the off-screen buffer.

The video board is also constructed so that the vertical interrupt signal goes directly to one of the IRQ pins on the 6201 DSP via a wire. This enables synchronization (synching) of all system operations with the vertical refresh of the output.

Figure 5:
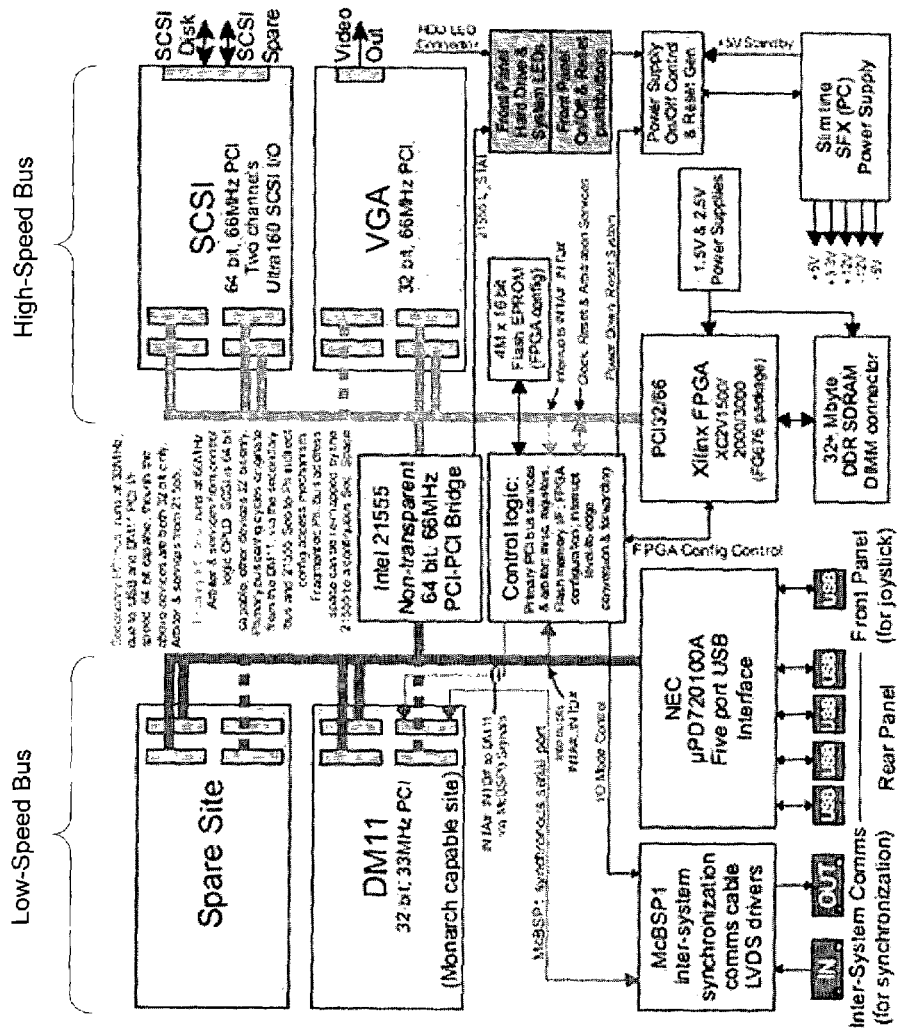
FIG. 5 is a block diagram illustrating an embodiment of the present invention.
Figure 6:
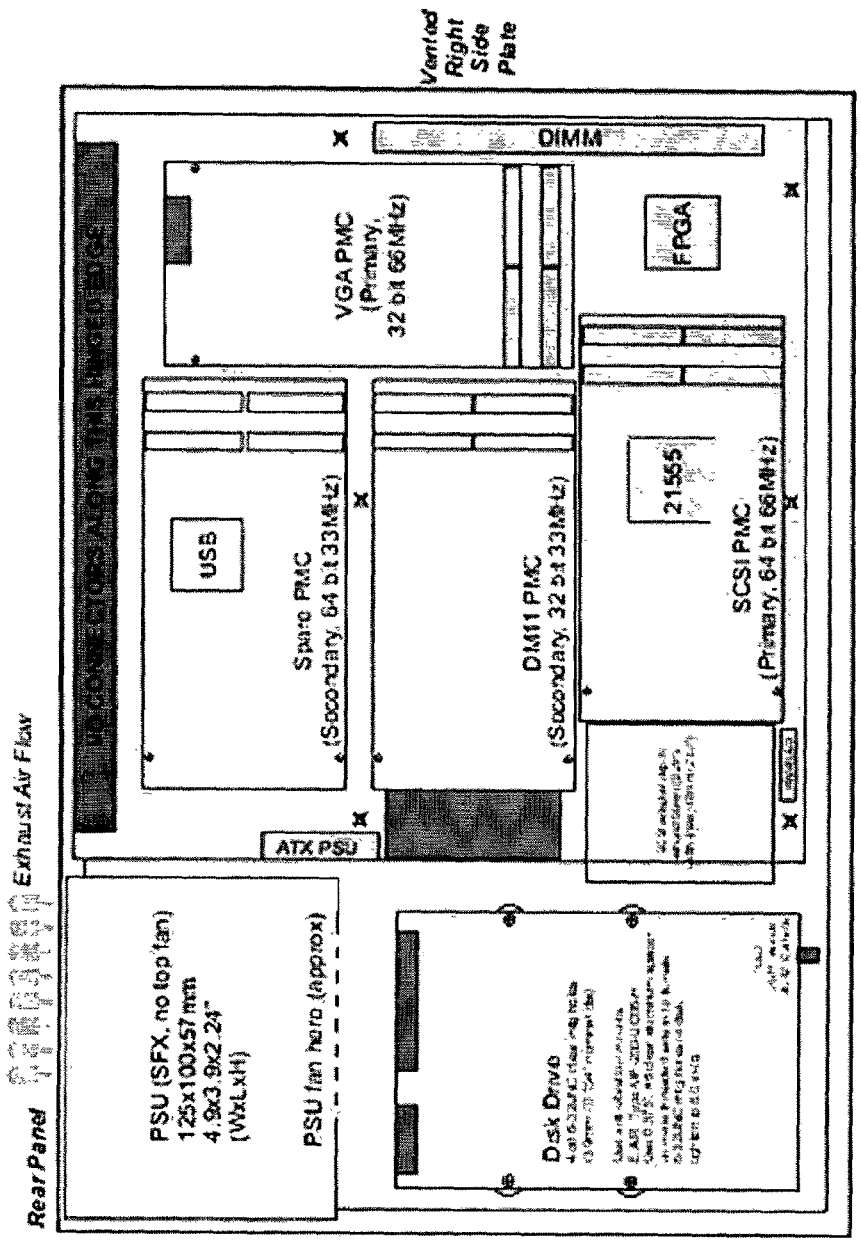
FIG. 6 is a block diagram per the FIG. 5 embodiment.

An alternate hardware embodiment is illustrated in FIGS. 5 and 6. An advantage of the embodiment include use of USB ports for providing improved communication with the system such as for acquiring debugging messages. A further advantage is the use of an FPGA allowing for real time manipulation of data. For example, image data can be stored compressed on the disk drive and be decompressed in real time using the FPGA when it is needed for viewing.

The software embodiment of the present invention has been optimized to run on our dedicated hardware as described herein. The software tools will also run on other systems as well including, for example, Windows NT and Linux/Unix systems. The software may be categorized as low-level software (for accessing the registers of the various chips) and high-level software (for using the low-level functions to build a working system).

Libraries of the software can be compiled so they can be executed on hardware as described above, in a computer with I/O (such as a display for printing messages), in a computer from FLASH (no I/O), on a stand-alone basis (no I/O) and in operating systems including but not limited to Windows NT, Unix, Linux, Windows 2000 or Windows CE.

According to the invention large images are converted to a preferred file format so the images can be read very efficiently. Besides the header, the files generated from the preferred file format contains the original image along with its various scaled zoom levels. Development of such preferred files is described herein below.

Various source image files may be read using the preferred file format (e.g., bmp, tiff jpg.) If an image file is less than 2 gigabytes then a file generated from the preferred file format can be created directly from that image. If an image file is larger than 2 gigabytes, then the image file must first be tiled into tiles that are less than 2 gigabytes each. These tiles can then be converted to a preferred file, which can be of any size. For example a bmp file over 2 gigabytes can first be concerted to a bim file. Thereafter, a file generated from the preferred file format can be generated.

Movie files may be created from a sequence of bmp files or from sequences of other formats (such as avi or jpg sequences). When the movie files are played back later, the in and out frame as well as the frame rate can be set.

An MAFR file can be created files created from the preferred file format and movie files. The MAFR file links the various images on the hard disk together. It is in the MAFR file where different images are related to each other spatially. In order to relate images to one another one coordinate system is chosen. For example, if the highest resolution image to be set to a scale factor of 1 is chosen, all of the lower resolution images are scaled according to their scale factor. For example, a 5 megabyte resolution images has a scale factor of 5 if the highest resolution image is 1 megabyte. To add an image to the existing database the image would be linked to a specific level of an existing image in the database. Once the image has been linked, its exact coordinates within the other image must be specified.

Movie files can also be linked to specific levels of an image. It is contemplated that the linking is to be defined to a specific window within a level. This allows for numerous videos for the same level.

Figure 21:
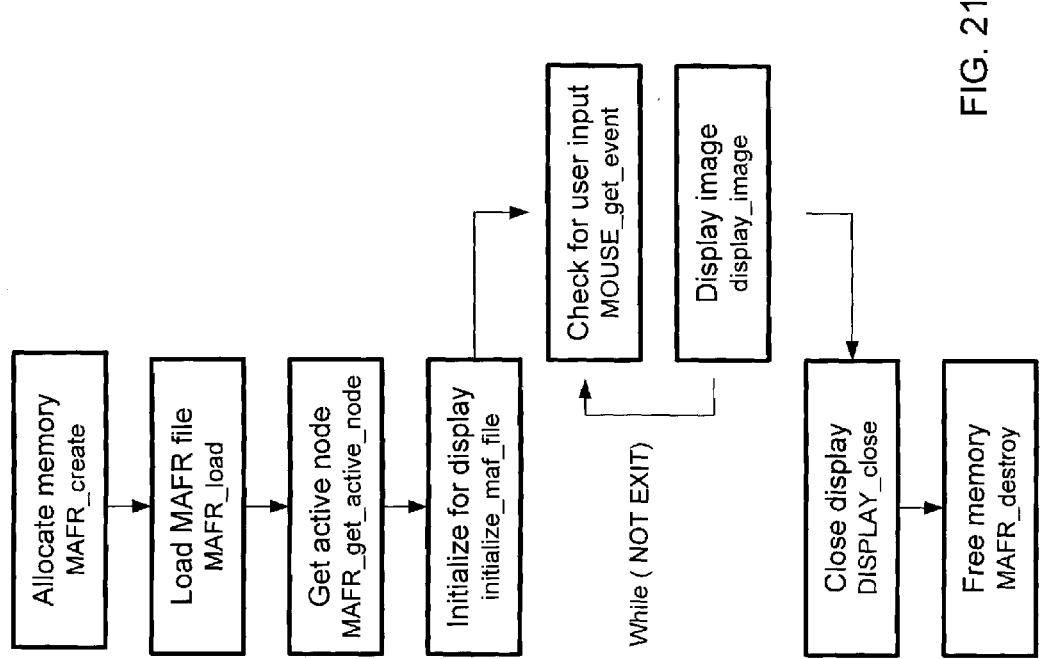
FIG. 21 is a block diagram of a main loop in a display program for an embodiment of the present invention.

The invention's system may take the input from a user via trackball, mouse, or joystick and display images accordingly. The program uses some of the function calls as appear in the software libraries to accomplish this. A diagram of the main loop is shown in FIG. 21. The display_image function is responsible for updating the VRAM buffers and displaying the correct window within the VRAM. A brief diagram of this function is shown under the "video" portion of FIG. 22.

The invention's system does not use an operating system. There are two immediate benefits from this approach. Because the image data needs to travel from the SCSI PMC board to the video PMC board via the PCI bus, it is important that the bandwidth of the PCI bus be maximized at all times. This can be guaranteed only if there is no operating system (such as windows NT or Linux) running. An operating system tends to cause an unpredictable amount of traffic on the PCI bus. The second benefit of not having an operating system is the drastically reduced boot time. Because the system is not loading an operating system, the reboot time is reduced to approximately 3 seconds.

A preferred embodiment of the invention is essentially standalone and outputs video. It should therefore be easy to integrate into most environments. Most VGA monitors accept progressive signals between 640×480 and 1280× 1024 at 60 to 85 Hz. The system is currently running at 640×480 at 75 Hz and can therefore be used in conjunction with a supercomputer or a regular office computer.

The invention enables the streaming of image data from the disk drive to the offscreen VRAM as the user roams through the onscreen VRAM. When the system issues a read command to the SCSI controller, the command is issued as non-blocking and therefore returns control back to the user while the image is being read from the disk in the background. This requires extensive low-level control of the registers on the SCSI controller.

An important feature of the invention is that the performance of the system does not degrade as the image size increases. Other systems degrade drastically as the image size increases because they need to seek through most of the image to actually read the lines they require. The invention requires images to be stored on the disk drive in a tiled format, which negates the above mentioned limitations. The image may be split into vertical tiles with 50% horizontal overlap. The display output is then guaranteed to be entirely within a single tile. When the image is read from the disk it is therefore guaranteed that only 1 seek followed by a read command will ever be required.

The invention utilizes prediction in order to preload tiles into the off screen VRAM buffer. The prediction may be based on simple velocity. A video board which is also contemplated would have 32 megabytes of VRAM (as opposed to the currently described board's 8 megabyte VRAM capacity), and this therefore allows preloading multiple predictive zones and then choosing one on the fly.

When streaming image data through a 3D graphics engine the bandwidth of the image stream is usually reduced drastically. The invention essentially takes the pixels from the disk drive and passes them into the VRAM without any manipulations. It is due to the fact that no manipulations are being made to the data that it can be burst into the VRAM without any bandwidth limitations.

The present invention provides for custom disk drive block sizes that are selected to match the display on which images are to be shown. Generally, a disk drive may be low-level formatted to a multiple integral of a selected display. In an embodiment of the invention the tile width is set to 1280 pixels and the disk drive block size is set to 640 pixels. Whenever a 1280×800 tile needs to be read from disk to VRAM, the system seeks to the correct block and then reads 4800 blocks (800 lines×2 blocks/line×3 colors). Because the image tiles are block aligned on the disk, disk access is significantly optimized.

Figure 7:
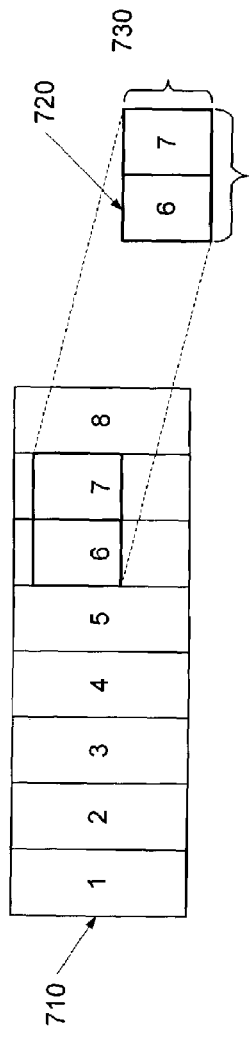
FIG. 7 illustrates an image that is to be transformed into tiles having horizontal overlap with adjacent tiles.

In FIG. 7 the outline of an image is shown 710. Images that users may be interested in showing on a display include, for example, geographic, chemical compound, biologic compound, organism, anatomical, and graphical images. Image 710 is shown divided into horizontal segments 1–8. These segments are for illustrative purposes only as the image 710 is not actually segmented as shown. However, because of disk drive storage limitations, image 710 may be made up of two or more files. The width of each segment is selected based on the width of the display on which an image is intended to be displayed. For example, display 720, having height 730 and width 740, may have a 1280×720 display resolution. In such case each of segments 1–8 may be 640 pixels wide.

Figure 8:
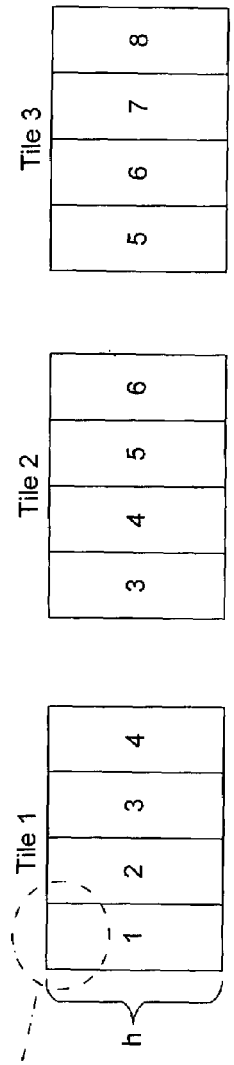
FIG. 8 illustrates tiles having horizontal overlap generated from the image illustrated in FIG. 7.

FIG. 8 illustrates three tiles, i.e., Tile 1–Tile 3, which were generated from the image 710 illustrated in FIG. 7. More particularly, Tile 1 includes tile sections 1–4, Tile 2 includes tile sections 3–6, and Tile 3 includes tile sections 5–8. As illustrated in Detail 810, each tile section includes rows of blocks of pixel data (i.e., data describing each pixel). For example, Row 1 includes block 830 pixel data, Row 2 includes block 840 pixel data, Row 3 includes block 850 pixel data. Tile 1 and Tile 2 have two tile sections, i.e., tile sections 3 and 4, that are virtually identical. Similarly, Tile 2 and Tile 3 have two tile sections, i.e., tile sections 5 and 6, that are virtually identical. These overlapping portions of adjacent tiles, described in more detail herein below, guarantee that a display image will always be available from a single tile loaded in VRAM. It is notable that the differences between overlapping portions are virtually imperceptible to a user. That is, there may be slight deviations between overlapping portions, however, a user would not be able to readily discern any difference when switching between them on a display.

Figure 9:
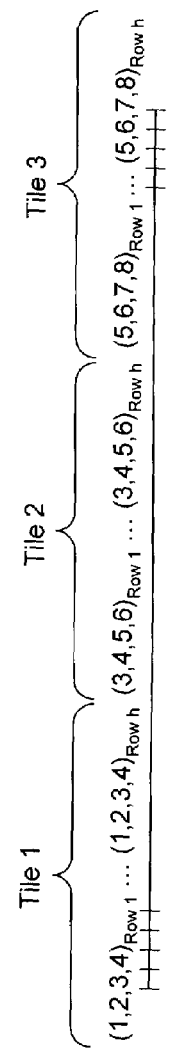
FIG. 9 illustrates a method of storing the tiles illustrated in FIG. 8.

FIG. 9 illustrates how Tile 1–Tile 3 are stored on a disk drive. Generally, the pixel data is stored as blocks starting from the top-left corner to the bottom-right corner of Tile 1, from the top-left corner to the bottom-right corner of Tile 2, and from the top-left corner to the bottom-right corner of Tile 3. More particularly, the blocks in Tile 1, Row 1 $((1,2,3,4)_{Row\ 1})$ are stored, then the blocks in Tile 1, Row 2 $((1,2,3,4)_{Row\ 2})$ are stored, etc., continuing to Tile 1, Row h $((1,2,3,4)_{Row\ h})$. Thereafter, the blocks in Tile 2, Row 1 $((3,4,5,6)_{Row\ 1})$ are stored, then the blocks in Tile 2, Row 2 $((3,4,5,6)_{Row\ 2})$ are stored, etc., continuing to Tile 2, Row h $((3,4,5,6)_{Row\ h})$. Thereafter, the blocks in Tile 3, Row 1 $((5,6,7,8)_{Row\ 1})$ are stored, then the blocks in Tile 3, Row 2 $((5,6,7,8)_{Row\ 2})$ are stored, etc., ending in Tile 3, Row h $((5,6,7,8)_{Row\ h})$. The data is stored on the disk drive as one contiguous string of data that are block aligned. Those skilled in the art will appreciate that this arrangement has significant advantages in system operation including improved data access rates.

Figure 10:
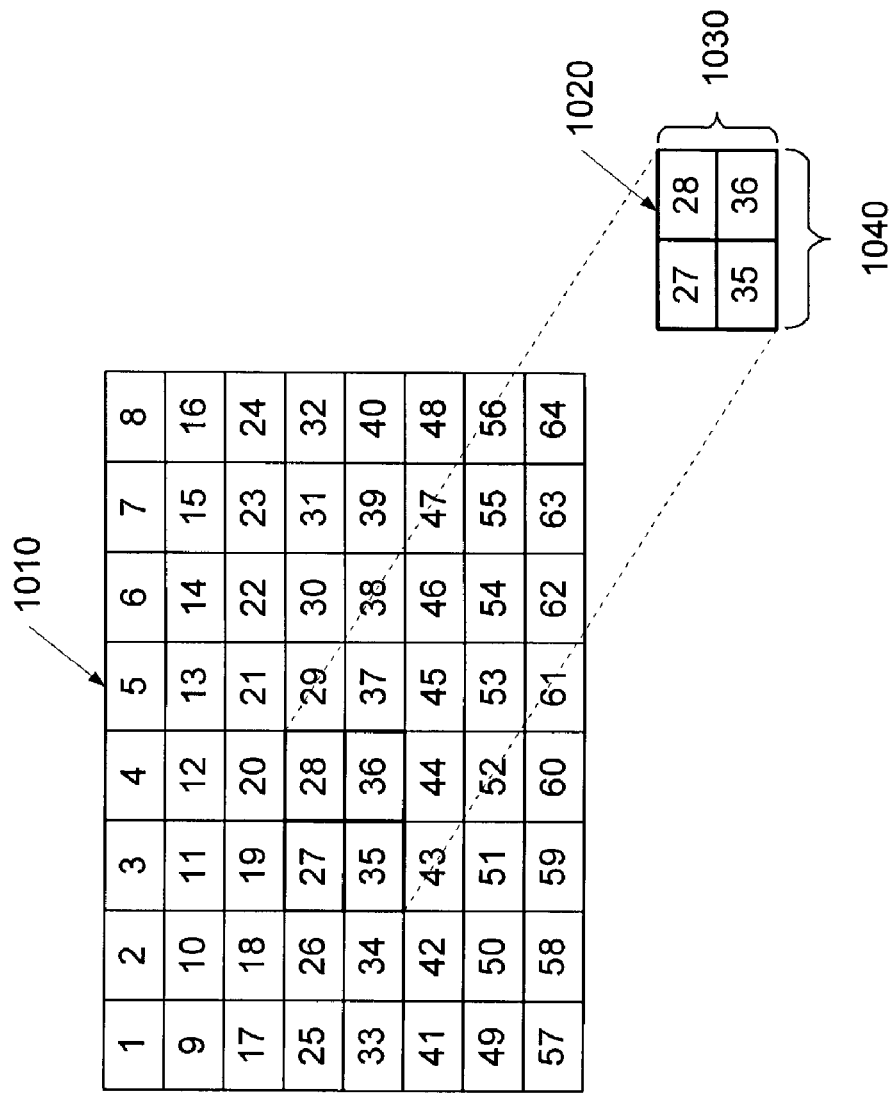
FIG. 10 illustrates an image that is to be transformed into tiles having horizontal and vertical overlap with adjacent tiles.

In FIG. 10 the outline of an image is shown 1010. Images that users may be interested in showing on a display include, for example, geographic, chemical compound, biologic compound, organism, anatomical, and graphical images. Image 1010 is shown divided into horizontal and vertical segments 1–64. These segments are for illustrative purposes only as the image 1010 is not actually segmented as shown. However, because of disk drive storage limitations, an original file may be made up of two or more files. The height and width of each segment is selected based on the height and width of the display on which an image is intended to be displayed. For example, display 1020, having height 1030 and width 1040, may have a 1280×720 display resolution. In such case each of segments 1–64 may be 640 pixels wide by 360 pixels high.

FIG. 11 illustrates nine (9) tiles, i.e., Tile 1–Tile 9, which were generated from the image 1010 illustrated in FIG. 10. More particularly, Tile 1 includes tile sections 1–4, 9–12, 17–20, and 25–28; Tile 2 includes tile sections 17–20, 25–28, 33–36 and 41–44; Tile 3 includes tile sections 33–36, 41–44, 49–52, and 57–60; Tile 4 includes tile sections 3–6, 11–14, 19–22, and 27–30; Tile 5 includes tile sections 19–22, 27–30, 35–38, and 43–46; Tile 6 includes tile sections 35–38, 43–46, 51–54, and 59–62; Tile 7 includes tile sections 5–8, 13–16, 21–24, 29–32; Tile 8 includes tile sections 21–24, 29–32, 37–40, and 45–48; and Tile 9 includes tile sections 37–40, 45–4 53–56, and 61–64. As illustrated in Detail 1110, each tile section includes rows of blocks of pixel data. For example, Row 1 of tile section 40 includes block 1120 pixel data, Row 2 includes block 1130 pixel data, Row 3 includes block 1140 pixel data.

Each tile has horizontal and vertical overlap portions that overlap with adjacent tiles. For example, Tile 2 and Tile 5 have eight (8) tile sections, i.e., tile sections 19, 20, 27, 28, 35, 36, 43, and 44 that overlap and are virtually identical. Further, Tile 2 and Tile 4 have four (4) tile sections, i.e., tile sections 19, 20, 27, and 28 that overlap and are virtually identical. Furthermore, Tile 4 and Tile 5 have eight (8) tile sections, i.e., tile sections 19, 20, 21, 22, 27, 28, 29, and 30 that overlap and are virtually identical. These overlapping portions of adjacent tiles, described in more detail herein below, guarantee that a display image will always be available from a single tile loaded in VRAM. It is notable that the differences between overlapping portions are virtually imperceptible to a user. That is, there may be slight deviations between overlapping portions, however, a user would not be able to readily discern any difference when switching between them on a display.

In FIG. 12 illustrates how Tile 1–Tile 9 are stored on a disk drive. Generally, the pixel data is stored as blocks starting from the top-left corner to the bottom-right corner of Tile 1, from the top-left corner to the bottom-right corner of Tile 2, from the top-left corner to the bottom-right corner of Tile 3, etc. ending at the bottom-right corner of Tile 9. More particularly, the blocks in Tile 1, Row 1 ($(1,2,3,4)_{Row\ 1}$) are stored, then the blocks in Tile 1, Row 2 ($(1,2,3,4)_{Row\ 2}$) are stored, etc., continuing to Tile 1, Row h ($(25,26,27,28)_{Row\ h}$). Thereafter, the blocks in Tile 2, Row 1 ($(17,18,19,20)_{Row\ 1}$) are stored, then the blocks in Tile 2, Row 2 ($(17,18,19,20)_{Row\ 2}$) are stored, etc., continuing to Tile 2, Row h ($(41,42,43,44)_{Row\ h}$). This process continues for each tile until ending in Tile 9, Row h ($(61,62,63,64)_{Row\ h}$). The data is stored on the disk drive as one contiguous string of data that are block aligned. Those skilled in the art will appreciate that this arrangement has significant advantages in system operation including improved data access rates.

Figures 13, 14:
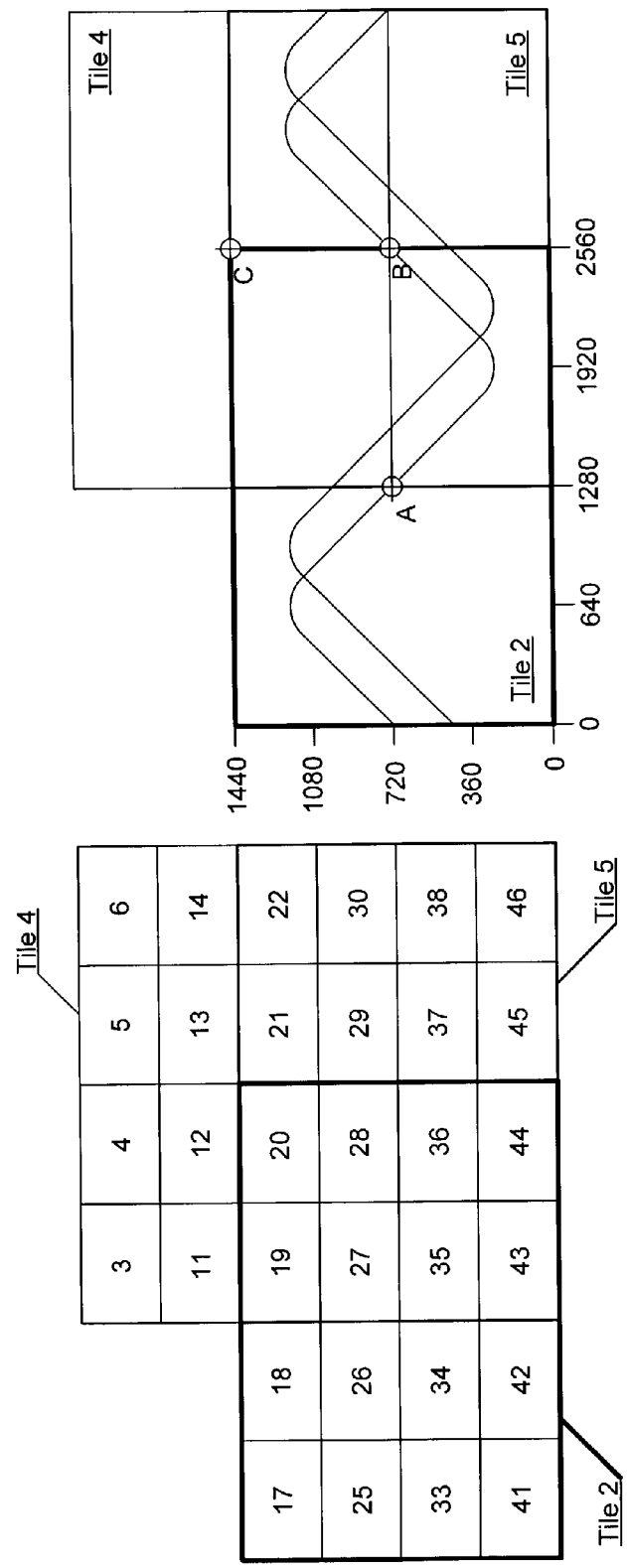
FIG. 13 shows Tiles 2, 4, and 5 of FIG. 11 superimposed in overlapping arrangement.
FIG. 14 shows Tiles 2, 4, and 5 superimposed in a manner similar to that shown in FIG. 13, however, including a double-sawtooth image.

Referring to FIG. 13, Tiles 2, 4, and 5, which are described above and illustrated in FIG. 11, are shown. The tiles are superimposed to further illustrate their relationship. That is, the tiles are superimposed so that the overlapping portions overlap. The outside border of each tile has a different line weight to distinguish them.

Figure 15:
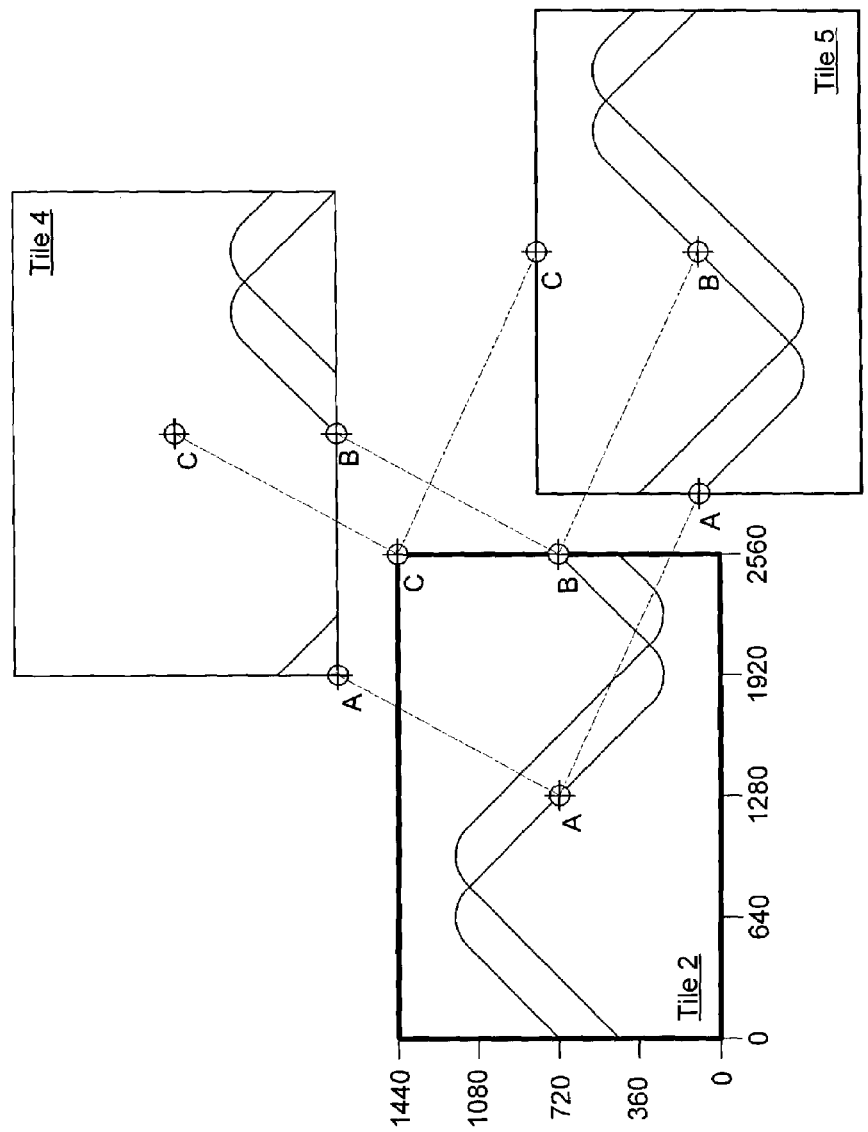
FIG. 15 shows Tiles 2, 4, and 5 from FIG. 14 separated to further illustrate their relationship.

Referring to FIG. 14, Tiles 2, 4, and 5 are superimposed as they are in FIG. 13, however, a double-sawtooth image is shown instead of the tile section borders and identifying numerals to facilitate a description of an embodiment of the present invention. Reference points "A," "B," and "C" are also included to further facilitate the description. Furthermore, for the description, each tile includes 2560×1440 pixels, therefore, each tile section includes 640×360 pixels. In FIG. 15, Tiles 2, 4, and 5 from FIG. 14 are shown separated to further illustrate their relationship.

FIGS. 16–19 illustrate a method for showing images on a display when panning horizontally or vertically. Those skilled in the art will appreciate that the present invention provides for smooth and seamless navigation of large images. That is, as a user pans across an image from tile to tile, there are no perceptible, that is, no readily viewable skips or jumps in the image. Furthermore, although not specifically shown in the figures, the present invention provides for very quick jumping from image to image when, for example, an input device instructs the system to jump to an image (as opposed to panning to an image) that is not adjacent to an image being viewed.

Figure 16:
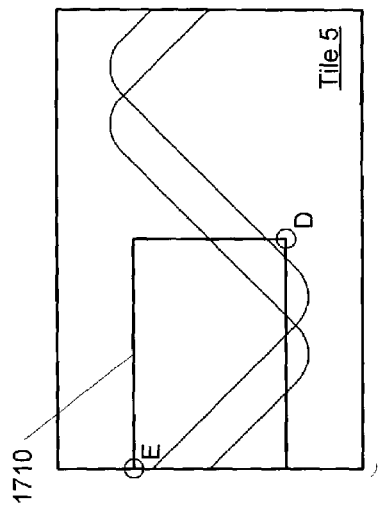
FIG. 16 shows Tile 2 of FIGS. 14 and 15, wherein a display image is shown to display the center-right-hand portion of the tile.

FIG. 16 illustrates Tile 2 as illustrated in FIGS. 14 and 15. To display a portion of the tile, the entire tile is stored in VRAM. A display image 1610 is illustrated in the center-right-hand portion of the tile. The display image 1610 is the portion of Tile 2 that was selected by a user for viewing on a display. In the example, the display image 1610 is 1280×720 pixels. The display image includes a portion of the double-sawtooth image. In order to ensure that the a complete image is shown on the display, the pixels in two diagonally opposing corners of the display image (e.g., the pixels in corners "E" and "D") are monitored.

Figure 17:
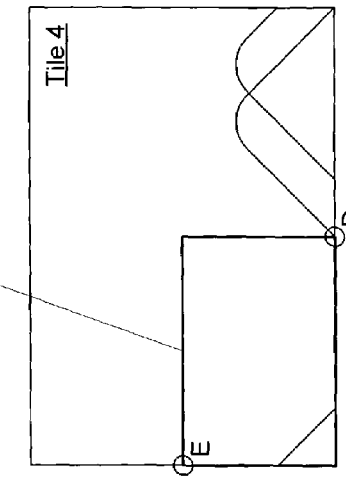
FIG. 17 shows Tile 5 of FIGS. 14 and 15, wherein a display image is shown to display the center-left-hand portion of the tile.

FIG. 17 illustrates Tile 5 as illustrated in FIGS. 14 and 15. A display image 1710 is illustrated in the center-left-hand portion of the tile. As user pans Tile 2 successive display images are transmitted from VRAM to the user for viewing. Each display image is monitored to determine if it is within the tile. In FIG. 17 it was determined that the display image selected by the user (assuming the user was panning horizontally in Tile 2 of FIG. 16) was not within Tile 2, but instead in the horizontally adjacent tile Tile 5. Because Tile 2 and Tile 5 are overlapped by at least an amount about equal to the width of the display, display image 1710 is virtually identical to display image 1610. Furthermore, because the present invention provides for transmitting images to the display rapidly and efficiently, the transition between the display image 1610 and the display image 1710 is imperceptible to the user.

Figure 18:
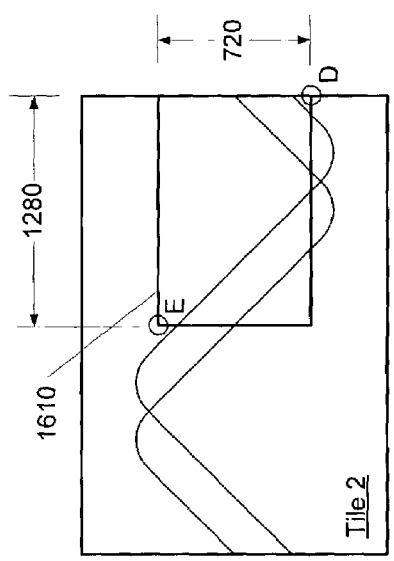
FIG. 18 shows Tile 5 of FIGS. 14 and 15, wherein a display image is shown to display the upper-left-hand portion of the tile.

FIG. 18 illustrates Tile 5 as illustrated in FIGS. 14 and 15. A display image 1810 is shown in the upper-left-hand portion of the tile. The display image 1810 is the portion of Tile 5 that was selected by a user for viewing on the display while panning vertically. In the example, the display image 1810 is 1280×720 pixels. The display image includes a portion of the double-sawtooth image. In order to ensure that the a complete image is shown on the display, the pixels in two diagonally opposing corners of the display image (e.g., the pixels in corners "E" and "D") are monitored.

Figure 19:
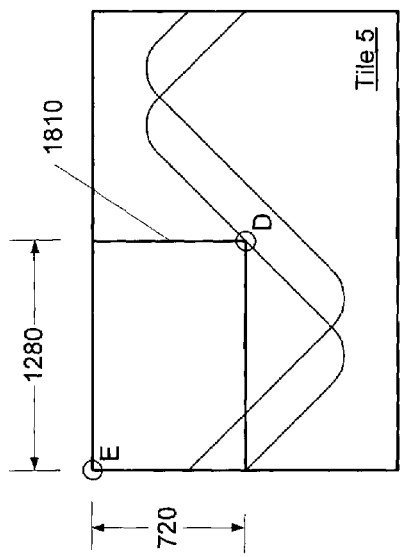
FIG. 19 shows Tile 4 of FIGS. 14 and 15, wherein a display tile is shown to display the lower-left-hand portion of the tile.

FIG. 19 illustrates Tile 4 as illustrated in FIGS. 14 and 15. A display image 1910 is shown in the lower-left-hand portion of the tile. As user pans Tile 5 successive display images are transmitted from VRAM to the user for viewing. Each display image is monitored to determine if it is within the tile. In FIG. 19 it was determined that the display image selected by the user (assuming the user is panning vertically in Tile 5 of FIG. 18) was not within Tile 5, but instead in the vertically adjacent tile Tile 4. Because Tile 5 and Tile 4 are overlapped by at least an amount about equal to the height of the display, display image 1810 is virtually identical to display image 1910. Furthermore, because the present invention provides for transmitting images to the display rapidly and efficiently, the transition between display image 1810 and the display image 1910 is imperceptible to the user.

Figure 20:
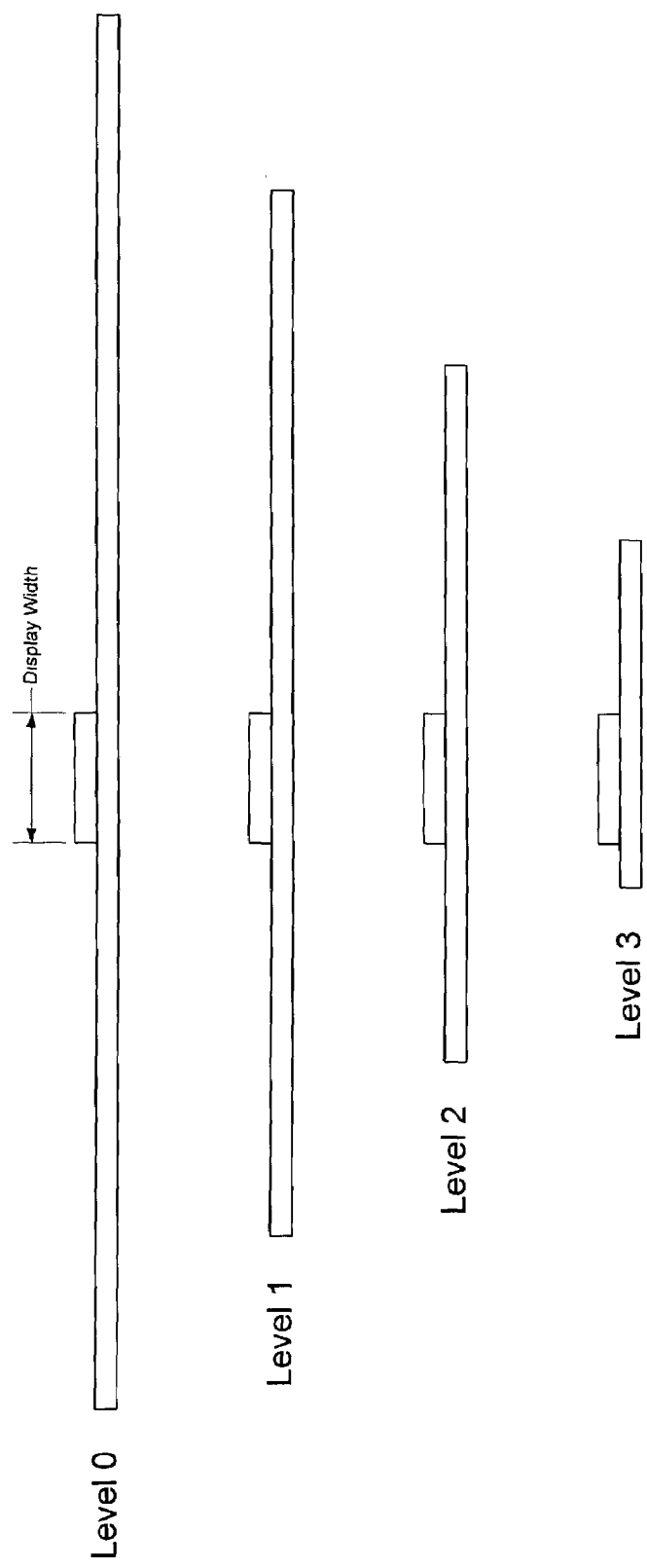
FIG. 20 illustrates a method of zooming pursuant to an embodiment of the present invention.

FIG. 20 illustrates a method of zooming pursuant to an embodiment of the present invention. A useful feature of the invention is the ability to zoom in and out of images very quickly. Instead of calculating the various zoom levels in real time from the massive original file, the zoom levels are calculated offline and stored on the disk drive. Prior art zooming methods zoom in and out in real time, thereby causing significant delays in showing an image.

An embodiment of the present invention for zooming includes the steps of storing an image on a storage device, receiving an instruction to generate and store multiple scaled levels of the image; scaling the image in accordance with the instruction; and storing the scaled levels on the storage device.

The embodiment may include, after the step of storing the scaled levels on the storage device, the step of receiving an instruction to transmit a particular scaled level of the image for viewing on a display. The receiving step may include receiving an instruction to generate and store multiple scaled levels of the image, wherein a scaling factor is selected from a group comprising a three decimal place number between 0 and 1, a five decimal place number between 0 and 1, and a ten decimal place number between 0 and 1. Furthermore, the image may be defined as by the tiles, each tile having two or more tile sections, the width of each tile section is such that the width of the display is a multiple of the width of each tile section, and the height of each tile section is greater than or about equal to the height of the display.

Figure 22:
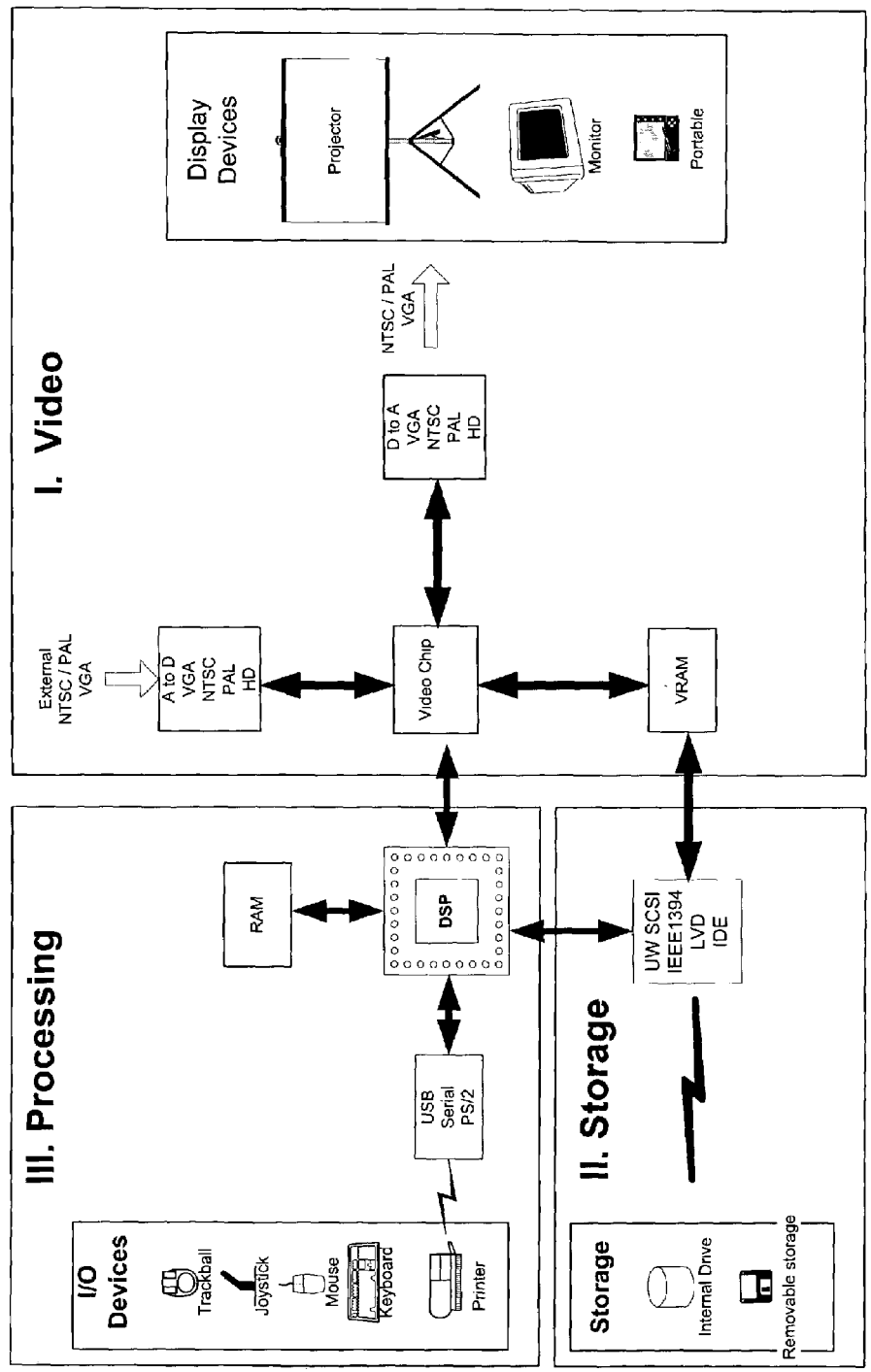
FIG. 22 is a block diagram of display-image functions per the FIG. 1 embodiment of the present invention

The invention also allows for a software toolset as well as a custom hardware solution to display large images as ideally as possible. FIG. 22 illustrates, under the sections labeled "processing" and "storage," the approach to such a system. The invention also provides a platform for future systems which can be anticipated to be lower cost and more portable.

Figure 23:
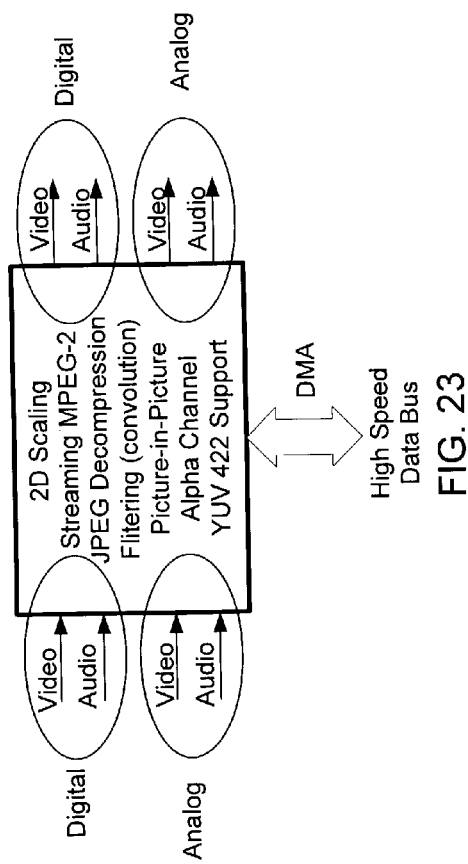
FIG. 23 shows the characteristics of a preferred video chip that may be used in an embodiment of the present invention.

A preferred video chip for a production scale portable display system is Peritek's latest VGA PMC board named the Eclipse3, or the like. The Eclipse3 is based on Peritek's Borealis3 graphics core. The significant difference between a prior Peritek board and this new one is the VRAM size. The old chip was limited to 8 megabytes of VRAM, while the new chip has 32 megabytes of VRAM. This allows embodiments of the present invention incorporating it to increase tile sizes and thereby increase the output resolution to at least 1024×768. It would also be desirable to build a custom video chip. The essential features of such a chip are shown in FIG. 23. By using simple JPEG decompression or some other image decompression, further embodiments of the invention can compress tiles individually and then decompress them in real time as they are being sent from the disk to the VRAM. Additionally, provision can be made for decoding MPEG streams in real time. The inputs on the chip allow the system to be in-line with a second device feeding a monitor.

A preferred embodiment is shown using a SCSI controller, but an IDE controller may suffice for performance. As prediction improves, the data rate from the disk drive can be reduced without affecting the overall performance of the system.

The invention has been tested with YUV (422–16 bit) images. This reduces the storage requirements by over 30 percent and increases performance drastically. The video board is already capable of transforming from YUV to RGB in real time.

The TMS320C6201 DSP chip is the main processor which is currently being used. The system of the invention can be run on other processors such as a Power PC chip running Linux. The clear advantage of running on a Linux system is the ability to add new features quickly by using standard Linux device drivers for any new devices such as a color printer, or a modem. The disadvantage of running on a Linux system is that the system may be hampered in terms of performance.

Figure 24:
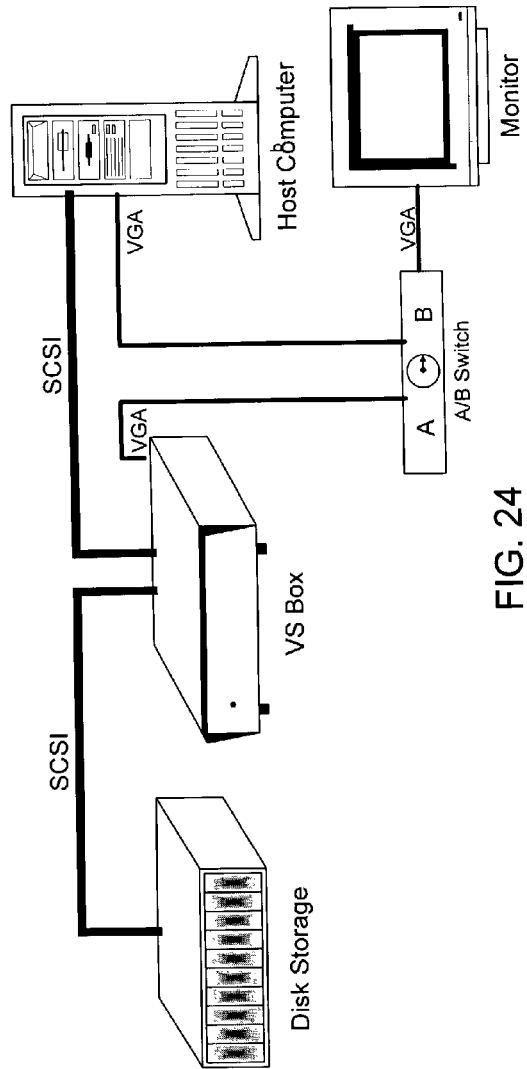
FIG. 24 is a hardware diagram of an embodiment of the present invention utilizing external storage.
Figure 25:
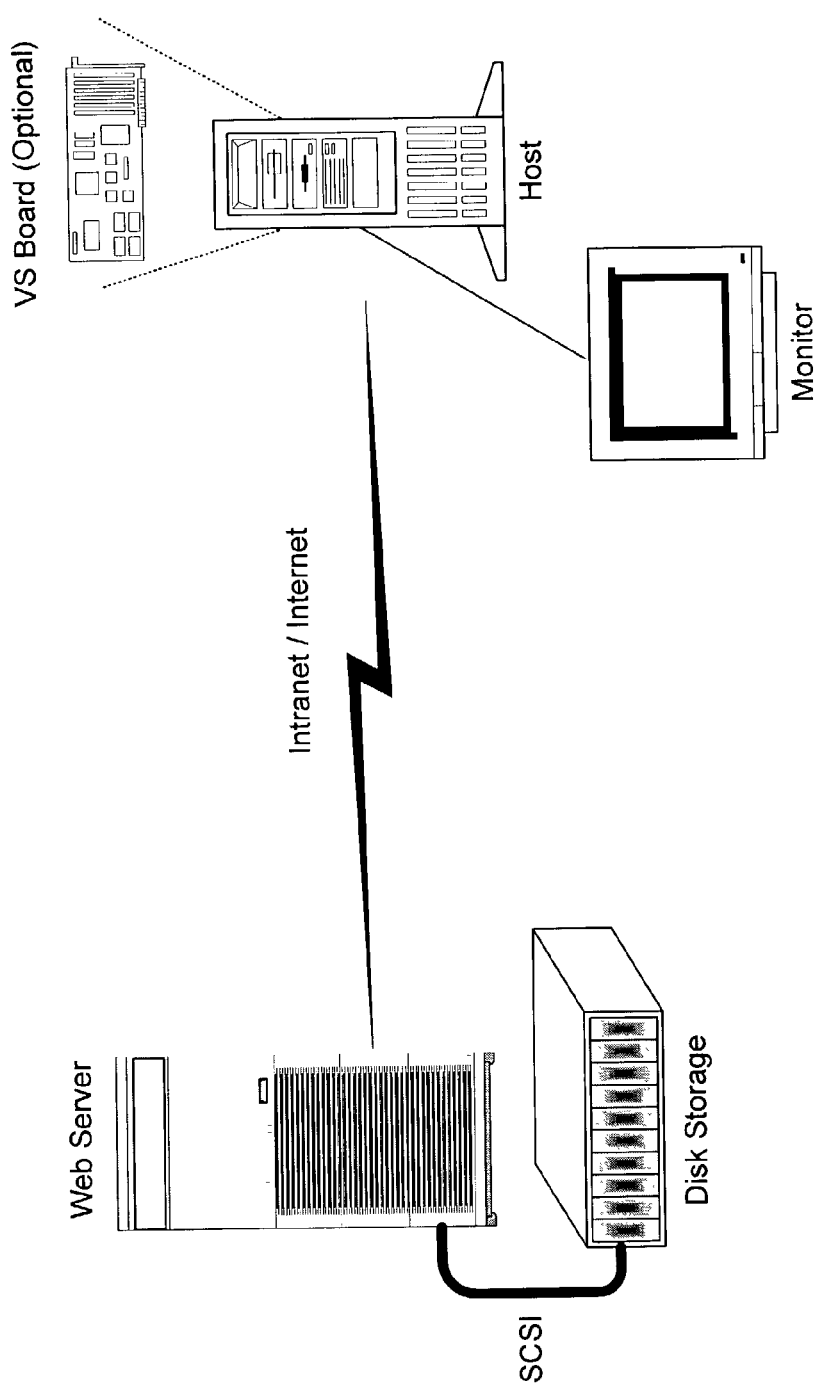
FIG. 25 is a hardware diagram of an embodiment of the present invention utilized in a networked environment, also using remote storage.

FIGS. 24 and 25 illustrate embodiments with a viewing system (VS) connected to a host computer or network. The viewing system may be one of the preferred embodiment described herein.

Referring to FIG. 24, VS box is connected to a host computer via a SCSI. There is a software application running on the host Windows or Unix machine that enables the host to communicate to the VS box via SCSI. One of the primary tasks of the software application is to translate files to and from the preferred file system on the disk drive(s). This will allow for third party applications to be written on the host, which use the VS API. Third party software companies could now take advantage of the speed at which the system could serve "sub-images" from large images stored on disk drive(s) to host memory via SCSI. The system allows for images to be transferred to the VS box and organized remotely on the host. If the VS box is disconnected from the host it will function as an independent unit. The A/B switch toggles the monitor between displaying the local host computer or the VS box. The system could also be used with an independent display device for both the host computer as well as the VS box.

In FIG. 25, the imagery is stored on a disk storage system attached to a server. The client workstation is connected to the server via a network (intranet or internet). The server essentially serves up the compressed image tiles via the network based on the client's requests. The application running on the client is very similar to the application running on the VS box. In order to improve performance, a VS board should be installed on the client. This will allow the decompression to be done in hardware (without affecting the client's overall performance) as well as providing the ability to load the VRAM with a new tile while enabling smooth roaming simultaneously. The bottleneck will be the network connection, which can be compensated for with increased image compression. This system will allow many users to access images from the same server.

Figure 26:
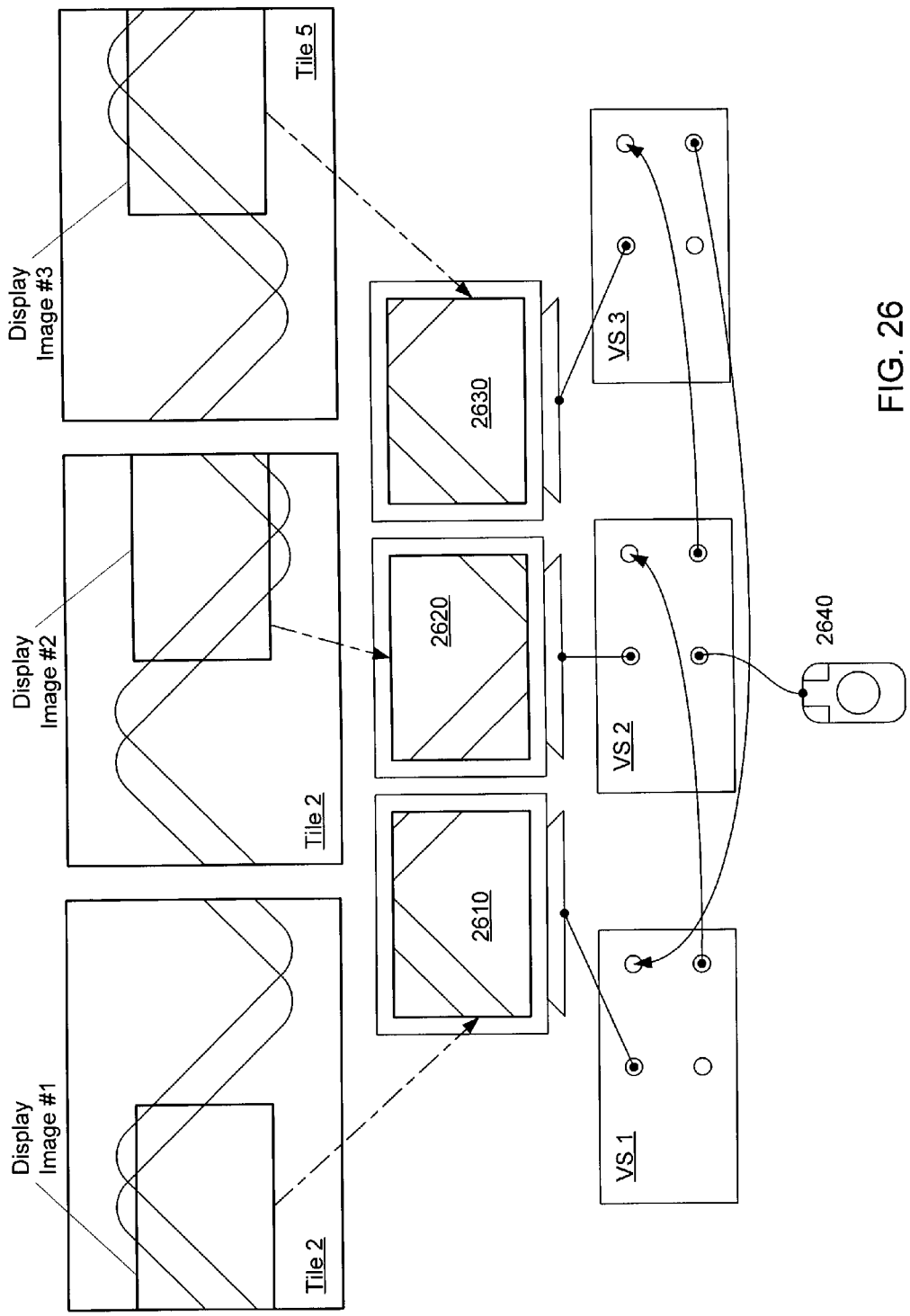
FIG. 26 is a hardware diagram of an embodiment of the present invention utilized in a cascade arrangement.

Referring to FIG. 26, a hardware diagram is shown of an embodiment of the present invention utilized in a cascade arrangement. The arrangement is a system wherein units are slaved to each other via a high speed bus. In the embodiment illustrated three VS systems are cascaded VS1, VS2, and VS3. Each VS system is attached to a display 2610, 2620, and 2630, respectively. VS2 includes a mouse 2640 attached to a USB port. Each VS system is connected to the other via inter-system communications ports (FIG. 5). Whenever the mouse moves, the information is sent from VS2 to VS3. VS3 goes to the appropriate display location and sends a command to VS1 so that it can go to the appropriate display location. Once VS1 goes there, it sends out a command to VS2 so that VS2 knows all of the other VS systems have gone to the new display location. Any number of VS systems can be cascaded.

While the invention has been described with reference to specific embodiments, the description is illustrative only and is not to be construed as limiting the scope of the invention. Various modifications and changes may occur to those having ordinary skill in the art without departing from the spirit and scope of the invention as defined by the appended claims.

What is claimed is:

1. A method of storing an image on a storage device in a tiled format, comprising:
    formatting the storage device to include a block size that is an integer multiple of a tile size, wherein the tile size corresponds to a display output;
    reading pixel data of a source image;
    generating, from the read pixel data, a first tile and a second tile, wherein the first tile and the second tile each have overlapping portions that overlap by an adjustable amount, and the overlapping portions include substantially identical pixel data;
    storing the first tile and the second tile on the storage device; and
    repeating the reading, generating, and storing a plurality of times to store the image,
    wherein the image is stored on the storage device as a contiguous string of data.

2. The method of claim 1, wherein the image is a geographic image.

3. The method of claim 1, wherein the image is stored in a file having a predetermined format.

4. The method of claim 1, wherein the adjustable amount of overlap comprises at least an amount substantially equal to a height and width of the display output.

5. The method of claim 1, wherein the source image is stored over two or more files.

6. The method of claim 5, wherein the two or more files are stored on a single storage device.

* * * * *